May 29, 1956     F. M. TROBRIDGE     2,747,602
FILLER VALVE FOR OIL TANKS
Filed Nov. 18, 1954
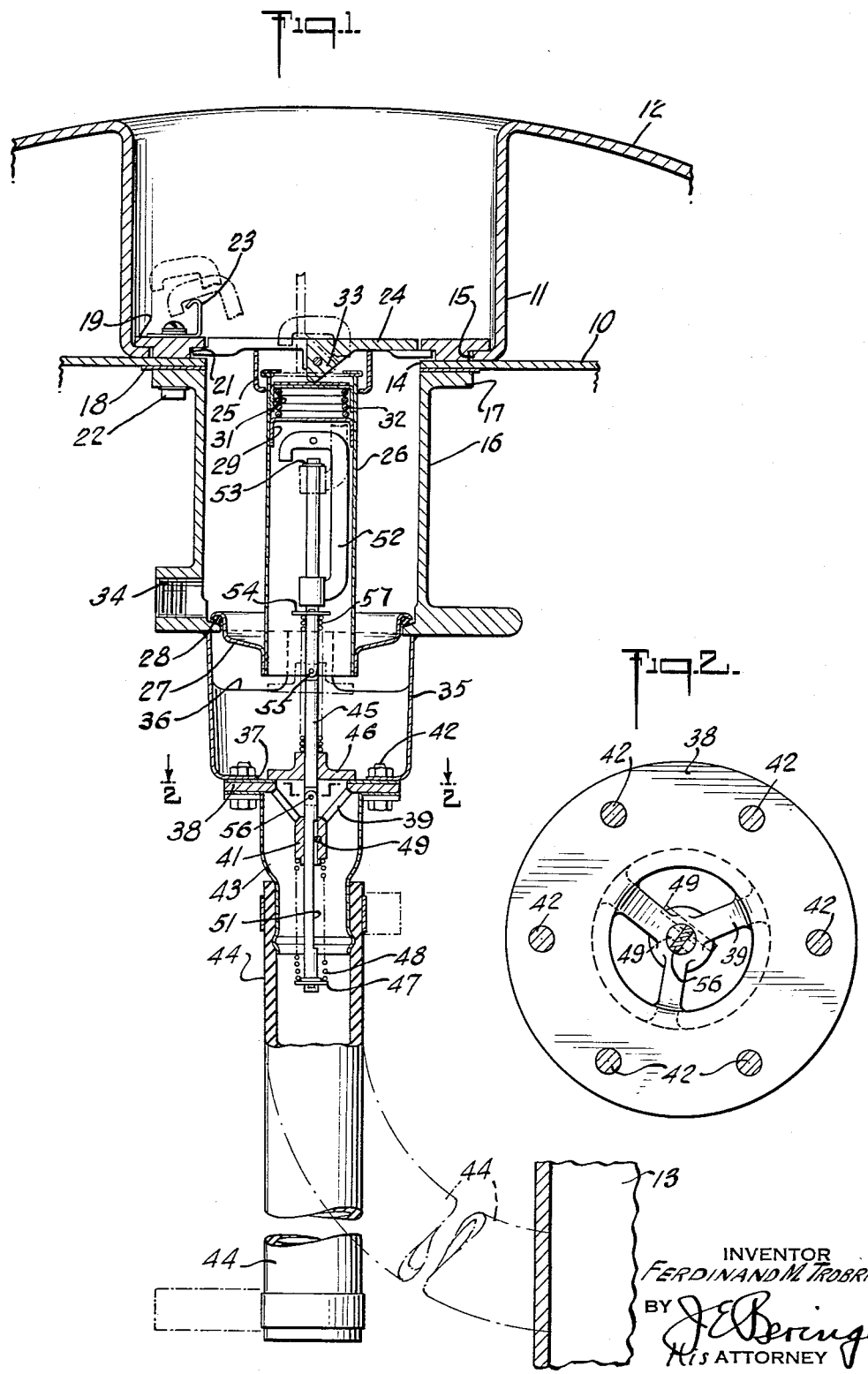

United States Patent Office 2,747,602
Patented May 29, 1956

2,747,602

FILLER VALVE FOR OIL TANKS

Ferdinand M. Trobridge, Dayton, Ohio, assignor to United Aircraft Products, Inc., Dayton, Ohio, a corporation of Ohio Application November 18, 1954, Serial No. 469,668

5 Claims. (Cl. 137—264)

This invention relates to filler valves and particularly to such valves as embodied in oil tanks as found in aircraft engine lubrication systems wherein the tank comprises an outer main compartment or chamber and an inner compartment or hopper where the oil may flow in bypassing relation to the oil in the main chamber.

In filling and refilling a system of the kind described it is desirable selectively to fill the main compartment and the hopper. The hopper may, for example, contain a lighter or diluted oil with which it is undesirable to mix the relatively heavy oil added to the main compartment for make up purposes.

An object of the invention, in an oil tank of the kind described, is to provide a filler valve assembly providing for either selective or conjoint filling in a simplified manner of the hopper and the main compartment.

Another object of the invention is to provide a filler assembly wherein the inlet to the hopper normally is closed and is accessible by hand manipulation of a valve element which can be hooked and held selectively in an open position.

A further object of the invention is to provide a filler valve assembly of general utility incorporating a valve element substantially of the kind described.

Other objects and structural details of the invention will appear from the following description when read in conjunction with the accompanying drawing, wherein:

Fig. 1 is a fragmentary view of an oil tank, and in part diagrammatic showing a filler valve assembly in accordance with the illustrated embodiment of the invention incorporated therein; and Fig. 2 is a view in cross section taken substantially along the line 2—2 of Fig. 1.

Referring to the drawing, an oil tank as used in aircraft engine lubricating systems may include a tank shell 10 fastened to the underside of a well 11 recessed in the skin 12 of the aircraft. The tank contains a hopper, a fragment of which is indicated at 13. The tank wall 10 has an opening 14 aligned with a somewhat wider opening 15 in the bottom of the well 11. To the underside of the tank wall 10 is fixed a cylindrical adapter member 16, the member 16 having at one end thereof a flange 17 abutting, through a gasket 18, the underside of the wall 10. On the top side of the wall 10 and inter-engaged with the bottom of the well 11 is a ring shaped member 19 having an inwardly facing slot 21. Bolts 22 extend through the flange 17, wall 10 and ring member 19 and hold the several parts in assembled relation. One of the bolts 22 also serves as attachment means for a catch 23 mounted on the ring member 19 for purposes to be described. The cylindrical adapter 16 is open at its upper end to register with the tank wall opening 14 and defines therewith a fill opening adapted to receive the nozzle of a filler hose. Such fill opening normally is closed by a cap 24 having a portion interfitting in the slot 21 and disengageable therefrom in a conventional manner by reason of interruptions (not shown) in the slot 21. The cap 24 is part of a closure cap assembly which further includes an underlying boss 25 supporting a cylinder 26 for relative sliding motion. The cylinder 26 is connected at its outer end to a guard plate 27 which is engageable with a seat 28 in the bottom of the adapter 16 and serves to inhibit splashing. Within the cylinder 26 is a relatively stationary plate 29 and a spaced apart relatively movable plate 31 separated by a compression spring 32. A projecting portion 33 on the cap 24 may in the installed position of the cap 24 enter the open upper end of the cylinder 26 and engage and depress the plate 31 against the urging of spring 32. The reactant force so generated assists in holding the cap 24 against accidental removal.

In the bottom of the adaptor 16 is an overflow opening 34. Secured to the bottom of the adaptor element 16, and in effect defining an extension thereof is a cup shaped member 35 having side openings 36 and a bottom opening 37 aligned with the longitudinal axis of the fill opening. Secured to the underside of the member 35 and extending across the opening 37 is a spider 38 having openings 39 and providing a longitudinal bearing 41 coaxial with the opening 37. The spider 38 is held in place by bolts 42 which also secure a sleeve 43 which extends in surrounding relation to the bearing 41 and serves as a mounting for one end of a flexible fluid conducting hose line 44. The other end of the hose line 44 is adapted to be connected, as indicated, to the hopper 13. Slidably mounted in the bearing 41 is a stem 45 which extends longitudinally in the filler valve assembly, downward into the sleeve 43 to its one end and upward through the cup like member 35 and into the cylindrical adaptor 16 at its other end. A valve element 46 is made fast on the stem 45 in position to engage or seat on the upper surface of the spider 38 in a manner to deny flow from the member 35 downward through the sleeve 43 and hose 44 to the hopper 13. Upward longitudinal motion of the stem and valve assembly serves to unseat the valve element and to permit such flow. On the bottom end of the stem 45 is a washer 47 providing a seat for a compression spring 48, the other end of which engages the bearing 41, the construction and arrangement of parts being such that the stem 45 is urged downward or in a direction to seat the valve 46 on the spider 38. A transverse pin 49 in the bearing 41 is received in a longitudinal groove 51 in the stem 45 and positively defines longitudinal limits of motion for the stem.

On the opposite end of the stem 45 is slidingly mounted a handle 52 the upper end of which is formed as a hook. The handle 52 is movable relatively to the stem 45 between limits defined by longitudinally spaced apart retainer elements 53 and 54. It will be apparent that the handle 52 provides a means for manually lifting the stem and valve assembly to unseat the valve 46 and open flow to the hopper. In the absence of such adjustment, incoming oil is restricted to flow out of the valve assembly by way of the openings 36 and thereby into the main chamber or compartment of the tank. The hook like upper end of the handle 52 is constructed and arranged to be engaged over the catch 23, in the manner indicated, to hold the valve stem assembly elevated and the valve open. The stem 45 is jointed at 55 and 56, as indicated, to permit of such latching opening of the valve without binding of the valve stem in the bearing 41 and to permit the upper part of the stem 44 to be displaced by the filler nozzle without tilting open the valve 46. A coil spring 56 surrounds the stem 45 between the valve element 46 and retainer 54, tending to hold the stem in an upright position.

It will be understood that preparatory to filling, the closure cap 24 is removed, and, further, that since the cylinder 26, splash plate 27 and associated parts are dependent from the cap 24 these elements are removable with the cap as a unit. Freedom of tilting adjustment of the stem 45 accordingly is possible as is the free insertion of the filler nozzle. The instant illustrated construction is in part a result of the requirements of a particular application of the invention. In essence, the invention may be considered to reside in a filler valve assembly of general utility, the most important elements of which are the cup-like member 35, the stem and valve assembly and the spider 38 or its equivalent. Such a filler valve assembly may be variously used and installed in oil tanks in accordance with the configuration and special requirements of each.

The assembly might, for example, be installed directly on the hopper with the opening through spider 38 communicating directly with the interior of the hopper. In this and similar adaptations the handle might be inaccessible to the hand, in which case a flexible cable or the like is attached thereto.

Also, and with respect to the joints 55 and 56, the illustrated joints in stem 45 are swinging connections featuring a transverse pin. If universal action is desired, however, they may be ball joints and the transverse limit pin 49 may be omitted.

It will be understood that the arrangement provides for selective filling of the hopper and tank, and further that both may be filled at the same time.

What is claimed is:

1. In an oil tank having a hopper and a main chamber outside said hopper, said tank having a fill opening in the wall thereof, a filler valve assembly including a substantially cup-shaped body dependent from said tank wall in said main chamber in position to receive oil introduced through said fill opening, said body having side openings for discharge of oil into said main chamber and a bottom opening, a connection from said bottom opening to said hopper, a valve reciprocable in said body for opening and closing said bottom opening, a stem to which said valve is fixed having an outer end extending toward said fill opening and manually accessible therethrough, means on said body providing a bearing for said stem, a handle on the outer end of said stem shaped as a hook, and means defining a joint in said stem between said handle and said bearing.

2. A filler valve assembly according to claim 1, characterized by a catch on said tank wall adjacent to the periphery of said fill opening engageable by said handle to hold said valve open.

3. A filler valve assembly, including a cup-shaped body having side openings and an opening in the bottom thereof, a stem member extending longitudinally through said bottom opening, a valve fixed on said stem member opening and closing said bottom opening in response to longitudinal adjustment of said stem member, a spring urging said stem member in one longitudinal direction, a handle on one end of said stem member for moving said stem member in the opposite longitudinal direction, said handle having the shape of a hook, means defining a joint in said stem member for flexure thereof between said handle and said valve, and a spring coiled about said stem member in surrounding relation to said joint.

4. A filler valve assembly, including a cup-shaped body having side openings and an opening in the bottom thereof, a spider secured to the bottom of said body and providing a bearing aligned with said bottom opening, a stem member slidable in said bearing and extending longitudinally through said bottom opening, a valve fixed on said stem member seating on said spider to close said bottom opening, a spring interposed between said bearing and one end of said stem member urging said stem member in a direction to seat said valve on said spider, a handle on the opposite end of said stem member for pulling said stem to unseat said valve, and means defining spaced apart joints in said stem member on opposite sides of said valve.

5. A filler valve assembly according to claim 4, characterized by a coil spring on said stem member in surrounding relation thereto between said valve and said handle.

References Cited in the file of this patent

UNITED STATES PATENTS

| | | |
|---|---|---|
| 641,185 | Borein | Jan. 9, 1900 |
| 1,696,079 | Doolin | Dec. 18, 1928 |
| 2,099,558 | Dibelka | Nov. 16, 1937 |
| 2,161,060 | Kelsey | June 6, 1939 |
| 2,405,442 | Mayo | Aug. 6, 1946 |
| 2,586,671 | Landis | Feb. 19, 1952 |